Nov. 24, 1959    W. J. GEORGE    2,913,850
FISH HOOK AND LURE KEEPERS
Filed Nov. 4, 1957
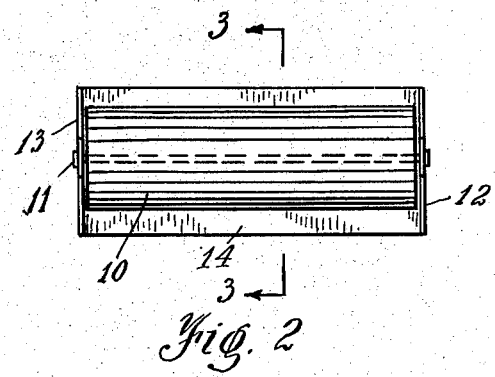
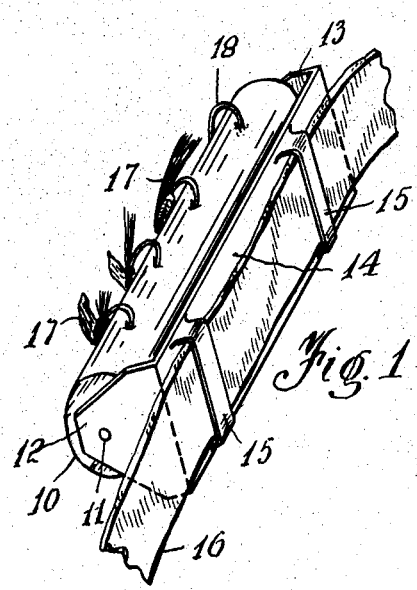
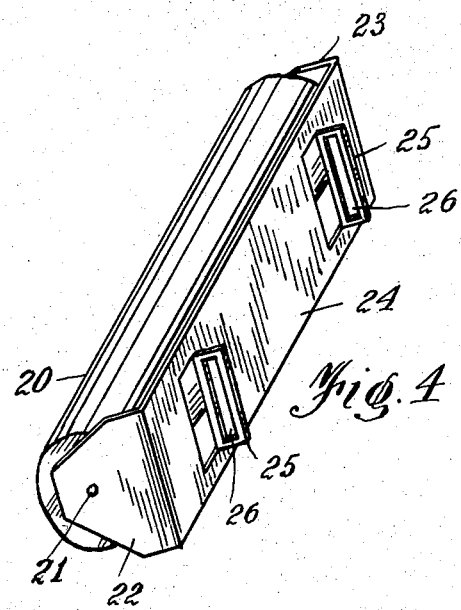
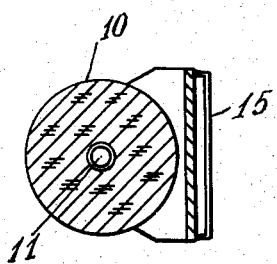
William J. George,
INVENTOR.

2,913,850

FISH HOOK AND LURE KEEPERS

William J. George, Canonsburg, Pa.

Application November 4, 1957, Serial No. 694,284

2 Claims. (Cl. 43—57.5)

This invention relates to hook keepers and particularly to a keeper adapted to hold fishing hooks and lures on the belt of a user.

The problem of providing a quick storage for fishing hooks and lures has long been recognized. Various devices have been heretofore proposed for accomplishing this purpose. For example books having spring clip pages, sheeps wool pages and plastic envelopes have been proposed. None of these proposals has been completely satisfactory for they are not sufficiently accessible and easy to use and the lures, as for example artificial flies, tend to be crushed and destroyed. As a result many anglers simply stick hooks and lures in convenient articles of clothing such as hat bands etc.

It is an object of the present invention to provide a quickly accessible, easy to use hook keeper.

It is another object of this invention to provide a fish hook keeper adapted to be adjustably positioned on the belt of a wearer.

It is a further object of the present invention to provide a hook keeper in which a fish hook may be readily inserted and removed without affecting the sharpness of the hook point.

It is another object of this invention to provide a fish hook keeper in which the hook receiving surface can be repeatedly renewed through 360 degrees.

Other objects, advantages and purposes of the invention will be apparent from a consideration of the following description and the accompanying drawings in which:

Figure 1 is an isometric view of a hook keeper in accordance with this invention.

Figure 2 is a front elevation of the fish hook keeper of Figure 1.

Figure 3 is a section on the line 3—3 of Figure 2.

Figure 4 is an isometric view of a second embodiment of this invention.

Referring to the drawings there is illustrated a cork cylinder 10 mounted for rotation on a shaft 11 between brackets 12 and 13 on a back panel 14. Loops 15 are fixed to the panel 14 to receive a users belt 16 so that the cork cylinder 10 extends outwardly from the belt 16 about the users waist. Artificial lures, such as flies 17, and hooks 18 are fixed and removed from the cork cylinder 10 by forcing the hook point into the cork cylinder. The brackets 12 and 13 bear resiliently against the ends of cork cylinder 10 to prevent free rotation and to retain the cylinder in a predetermined position.

When a portion of the exposed face of cylinder 10 becomes so perforated as to be no longer satisfactory as a hook keeper, a new position of cylinder 10 is rotated into position until the entire 360 degrees of surface have been used.

In Figure 4 there is illustrated a second embodiment of this invention showing a prism 20 in place of cylinder 10. In this form a polygonal cylinder or polyhedron 20 of cork or like soft material easily penetrable by hooks is mounted on shaft 21 for adjustable-frictional rotation between brackets 22 and 23 and a back panel 24. Loops 25 are formed by punching a rectangle out of the panel 24 normal thereto and forming an opening 26 therein to receive a users belt.

While certain preferred embodiments of this invention are illustrated and described herein it will be understood that this invention may be otherwise embodied within the scope of the following claims.

I claim:

1. In a fishing hook and lure keeper device of the character shown and described that is adapted to be carried and supported on the belt of a fisherman and that has a member always presenting a resilient portion to receive and removably mount hooks and lures without necessitating the use of both hands by the fisherman and which member will present another resilient portion when one portion becomes worn out with use, said device comprising a member having an elongated solid body of somewhat cylindrical shape and of soft resilient material that has an outer periphery extending continuously about its longitudinal axis, said body terminating at opposite ends of its longitudinal axis in substantially planar end faces, an axial shaft mounted concentrically along the longitudinal axis of said body and having end portions extending therefrom, a holder having a back panel portion extending longitudinally along said body in close adjacency to its peripheral surface, said panel portion having longitudinally spaced-apart loop portions extending backwardly therefrom for receiving a belt therethrough to carry it, and a pair of end bracket portions extending transversely forwardly from opposite longitudinal ends of said back panel portion along and in a resilient abutting relationship with planar end faces of said body to receive the end portions of said shaft and retain said body against free rotation with respect to said end bracket portions, and said shaft mounting said body for 360 degrees rotation with respect to said end bracket portions, so that said body may be manually turned against resilient resistance offered by said end bracket portions against its said planar end faces to progressively present resilient portions of said body to the front of said holder for receiving the hooks and lures when a presently-presented portion becomes worn out in use.

2. A keeper device as defined in claim 1 wherein said body is of cork material in the shape of a polyhedron.

References Cited in the file of this patent

UNITED STATES PATENTS

| 2,332,036 | Wilburn | Oct. 19, 1943 |
| 2,436,109 | Kollman | Feb. 17, 1948 |
| 2,814,152 | Trujillo | Nov. 26, 1957 |